United States Patent
Roh

(10) Patent No.: US 8,891,710 B2
(45) Date of Patent: Nov. 18, 2014

(54) FREQUENCY-DOMAIN FILTERING FOR CHANNEL ESTIMATION IN COMMUNICATIONS SYSTEMS

(75) Inventor: June Chul Roh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 177 days.

(21) Appl. No.: 13/565,572

(22) Filed: Aug. 2, 2012

(65) Prior Publication Data

US 2013/0039446 A1 Feb. 14, 2013

Related U.S. Application Data

(60) Provisional application No. 61/522,564, filed on Aug. 11, 2011.

(51) Int. Cl.
*H04B 1/10* (2006.01)
*H04L 25/02* (2006.01)

(52) U.S. Cl.
CPC ........ *H04L 25/0204* (2013.01); *H04L 25/0224* (2013.01); *H04L 25/025* (2013.01); *H04L 25/022* (2013.01)
USPC ........... 375/350; 375/346; 375/316; 375/231; 375/230; 375/229; 455/307; 455/296; 455/130

(58) Field of Classification Search
CPC ............ H04L 25/022; H04L 25/03159; H04L 25/061; H04L 25/03292; H04L 25/03968; H04L 25/0202; H04L 25/064; H04L 27/2695; H04L 27/2672; H04B 7/0854
USPC ................ 375/350, 346, 316, 231, 230, 229; 455/307, 296, 130
See application file for complete search history.

(56) References Cited

U.S. PATENT DOCUMENTS

| | | | |
|---|---|---|---|
| 7,149,239 B2 * | 12/2006 | Hudson | 375/144 |
| 2005/0174593 A1 * | 8/2005 | Piersol et al. | 358/1.13 |
| 2009/0028220 A1 * | 1/2009 | Roh et al. | 375/136 |
| 2010/0272194 A1 | 10/2010 | Zhengang et al. | |
| 2012/0163497 A1 | 6/2012 | Kim et al. | |
| 2012/0201336 A1 * | 8/2012 | McNamara | 375/349 |

OTHER PUBLICATIONS

Chaiyod Pirak, et al., "LS FFT-Based Channel Estimators Using Pilot-Embedded Data-Bearing Approach in Space-Frequency Coded MIMO-OFDM Systems", IEEE Communications Society, 2006.

* cited by examiner

*Primary Examiner* — Eva Puente
*Assistant Examiner* — Michelle M Koeth
(74) *Attorney, Agent, or Firm* — Steven A. Shaw; Frederick J. Telecky, Jr.

(57) ABSTRACT

A method of channel estimation includes receiving a signal after transmission over a media having a plurality of sub-carriers in a frequency band. The signal is preprocessed including performing a fast Fourier transform (FFT) to generate a plurality of frequency-domain samples. Channel estimating is applied to the plurality of frequency-domain samples using (i) least squares (LS) estimation, wherein the LS estimation generates intermediate LS channel estimates for each of the sub-carriers, and (ii) frequency-domain filtering and scaling the intermediate LS channel estimates. The frequency-domain filtering uses a common frequency-domain filter consisting of a single filter coefficient vector having a plurality of frequency-domain filter coefficients to generate refined channel estimates for each of the plurality of sub-carriers.

26 Claims, 5 Drawing Sheets

FREQUENCY-DOMAIN FILTERING FOR CHANNEL ESTIMATION IN COMMUNICATIONS SYSTEMS

CROSS REFERENCE TO RELATED APPLICATIONS

This application and the subject matter disclosed herein claims the benefit of Provisional Application Ser. No. 61/522,564 entitled "Channel Estimation Method for OFDM Systems" filed Aug. 11, 2011, which is herein incorporated by reference in its entirety.

FIELD

Disclosed embodiments relate to the field of frequency-domain equalization for communications systems.

BACKGROUND

Frequency-domain equalization is performed in some communications systems, such as communications systems based on orthogonal frequency domain multiplexing (OFDM) and single-carrier systems with frequency-domain equalization (SC-FDE). An OFDM system transmits multiple data symbols at the same time over a media on a plurality of sub-carriers in a frequency band. The sub-carriers (both pilot and data sub-carriers) with the same time index together make up an OFDM symbol.

When a transmitted OFDM signal is received by a receiver, the received signal is somewhat different from the transmitted signal due to the channel (typically a frequency-selective channel) and the noise. Discounting noise, the transmitted data symbols can be known from the received signal if the frequency response of the channel (also called "channel frequency response") is also known. OFDM receivers typically estimate channel frequency response (also called "channel estimation") in order to obtain the transmitted data symbols before demodulation is performed. Since the OFDM channel is typically frequency-selective and time varying, channel estimation is performed continuously and the received OFDM sub-carriers are equalized using the estimated channel frequency response.

FIG. 1 is a block diagram depiction of a conventional wireless OFDM receiver 100 which employs frequency-domain equalization. Receiver 100 receives an RF signal in the form of symbols including a plurality of sub-carriers (tones) via antenna 101 as a sample data stream from the left to the right of the FIG. The analog front end (AFE) block 105 receives the signal from the antenna 101, which may include a variable gain amplifier (VGA), down-converter (or mixer), RF/analog filters and analog-to-digital (A/D) converter. Cyclic prefix (CP) removal block 108 after the AFE block 105 can be used to remove the doubled (redundant) CP on an OFDM frame preamble structure for the IEEE 802.15.4 g standard having the LTF structure 300 including two LTF symbols shown in FIG. 3 as described below. More generally, in OFDM systems (including wireless local area networks (LANs)), CP removal block 108 removes the single CP included in the preamble.

After CP removal by CP removal block 108, the samples are then converted from serial to parallel (1 to N) by serial to parallel (S/P) conversion block 110. The receiver 100 includes a FFT block 115 which performs a Fast Fourier Transform (FFT) on the data from S/P conversion block to generate a plurality of frequency-domain samples, and then feeds the results to the frequency-domain equalization block 120. Frequency-domain equalization block 120 receives channel estimates for the respective sub-carriers from the channel estimation block 125 shown.

Frequency-domain equalization block 120 is operable to compensate the received signal for linear distortion from the channel (e.g., multipath effects). Error detection, decoding and parallel to serial conversion is performed by error decoding parallel to serial (P/S) conversion block 130, followed by symbol demapping block 135, then forward error correction (FEC) decoding block 140 to recover the original (transmitted) data stream.

In real-world systems, the signal processing modules (all blocks except antenna 101 and AFE block 105) are controlled by software run by a computing device, such as a digital signal processor (DSP) or application specific integrated circuit (ASIC). Although some channel estimation algorithms are available which generally provide good performance (i.e. accurate channel estimates), such as "optimal" minimum mean square error (MMSE)-based estimation algorithms, optimal MMSE requires different filter coefficient vectors each comprising a plurality of filter coefficients for processing each of the sub-carriers, particularly for sub-carriers toward the edge tones, and therefore involves high complexity algorithms and a high memory requirement, which generally become high cost solutions.

SUMMARY

Disclosed embodiments are directed to relatively low-complexity channel estimation methods including frequency-domain filters for communications systems, with at most only a negligible performance sacrifice compared to known "optimal" minimum mean square error (MMSE) estimators. A "single frequency-domain filter" as used herein is implemented by a single filter coefficient vector which includes a plurality of filter coefficients. Frequency-domain filters employed by known optimal MMSE estimators in contrast use a different filter coefficient vector for each sub-carrier, especially for edge sub-carriers (edge tones), which results in a high memory requirement. In contrast, disclosed channel estimation utilizes a single filter coefficient vector which is operable to combine two or more of the frequency domain samples on neighboring sub-carriers (k) for generating refined channel estimates for all the sub-carriers including edge tones, allowing a significant reduction in the memory requirement to store the frequency-domain filter coefficients. Reducing the memory requirement for the implementation reduces the implementation cost.

Following FFT to generate a plurality of frequency-domain samples and least squares (LS) processing to generate intermediate channel estimates, a common (single) frequency-domain filter is applied to all sub-carriers including edge tones to refine the channel estimates. Using the single filter coefficient vector, frequency-domain samples on the neighboring sub-carriers are combined (or filtered), followed by scaling applied to the output of the frequency-domain filter to generate final channel estimates for each of the sub-carriers. The scaling factor applied may be different for each sub-carrier, such as being different for each edge tone, and a constant for non-edge tones.

Disclosed channel estimation methods can be applied to wireless or wired networks. In one particular embodiment, OFDM PHY frames are processed by performing channel estimation to the two long training field (LTF) symbols in the preamble in the case of an OFDM PHY for IEEE 802.15.4 g.

BRIEF DESCRIPTION OF THE DRAWINGS

Reference will now be made to the accompanying drawings, which are not necessarily drawn to scale, wherein.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection, unless qualified as in "communicably coupled" which includes wireless connections. Thus, if a first device couples to a second device, that connection may be through a direct electrical connection, or through an indirect electrical connection via other devices and connections.

The following notations are used herein:

$N_a$: the number of active tones (or sub-carriers), typically the sum of the number of pilot tones and the number of data tones. The DC tone is typically not included in the count of active tones.

$c=[c_{(-N_a/2)}, \ldots, c_{(-1)}, c_{(1)}, \ldots, c_{(N_a/2)}]^T$: frequency-domain known training sequence;

$r=[r_{(-N_a/2)}, \ldots, r_{(-1)}, r_{(1)}, \ldots, r_{(N_a/2)}]^T$: frequency-domain received signal (after preprocessing including FFT), and $h=[h_{(-N_a/2)}, \ldots, h_{(-1)}, h_{(1)}, \ldots, h_{(N_a/2)}]^T$: actual channel frequency response.

Figure 2A:
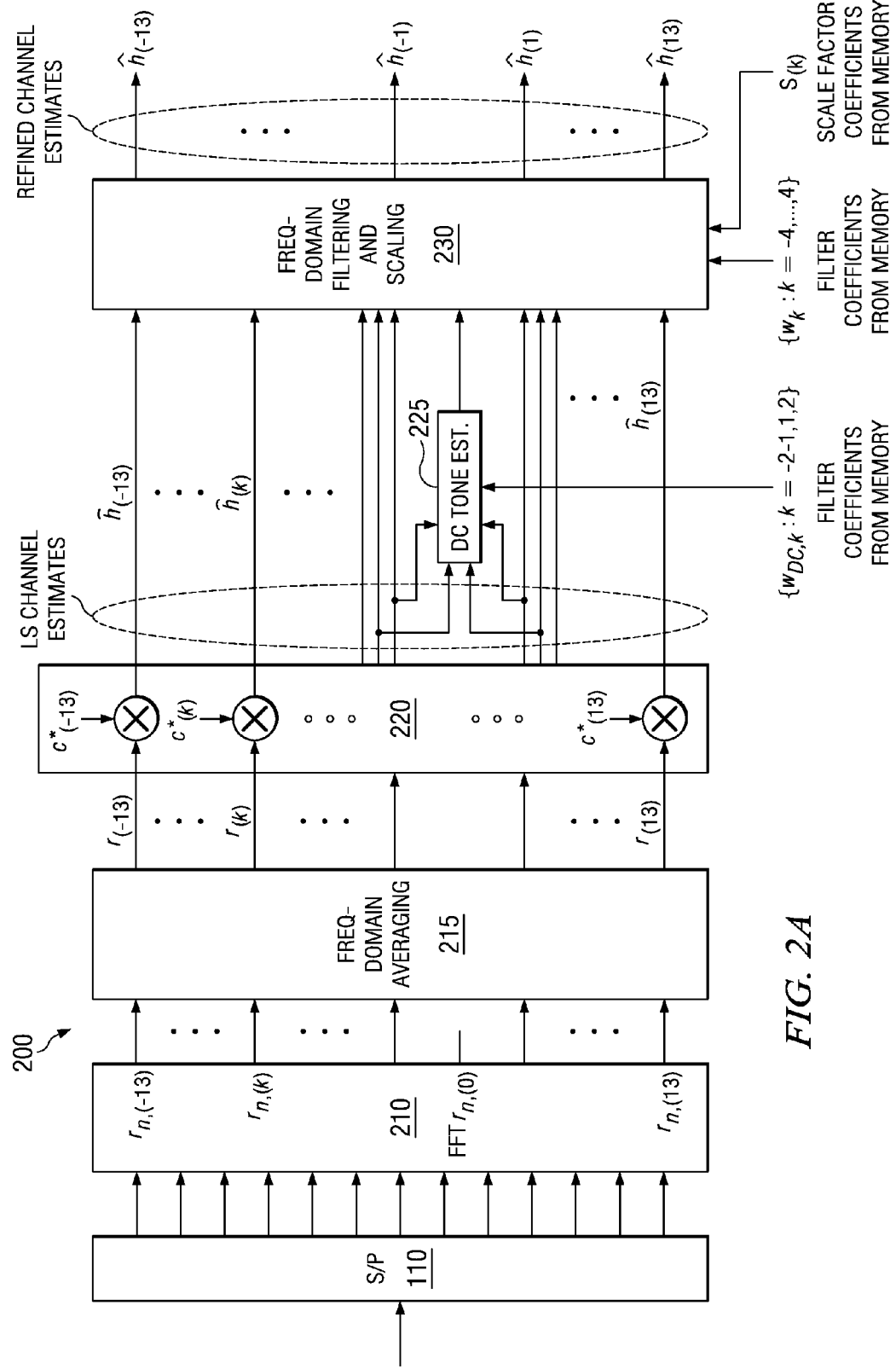
FIG. 2A is a top-level block diagram for an example channel estimator including frequency-domain averaging, FFT and LS signal processing to provide intermediate channel estimates, as well as a single frequency-domain filter applied to all sub-carriers including edge tones to generate refined channel estimates, according to an example embodiment. This FIG. depicts the particular case with $M_{DC}=4$ and $M_{CE}=9$.

FIG. 2A is a top-level block diagram for an example channel estimator 200 according to an example embodiment. Channel estimator 200 receives sample data and includes serial to parallel (S/P) conversion block 110 which provides parallel data to FFT block 210. Coupled to the output of FFT block 210 is an optional frequency-domain averaging block 215, which is coupled to LS channel estimation block 220 which provides intermediate channel estimates. LS channel estimation block 220 is coupled to a common (single) frequency-domain filtering and scaling block 230 which processes to all sub-carriers including edge tones to generate refined channel estimates. FFT block 210 processes the signal to generate a frequency-domain sample representation shown as $r=[r_{(-N_a/2)}, \ldots, r_{(-1)}, r_{(1)}, \ldots, r_{(N_a/2)}]^T$: Frequency-domain averaging block 215 performs frequency-domain averaging for each of the plurality of sub-carriers (per-tone based averaging).

Figure 2B:
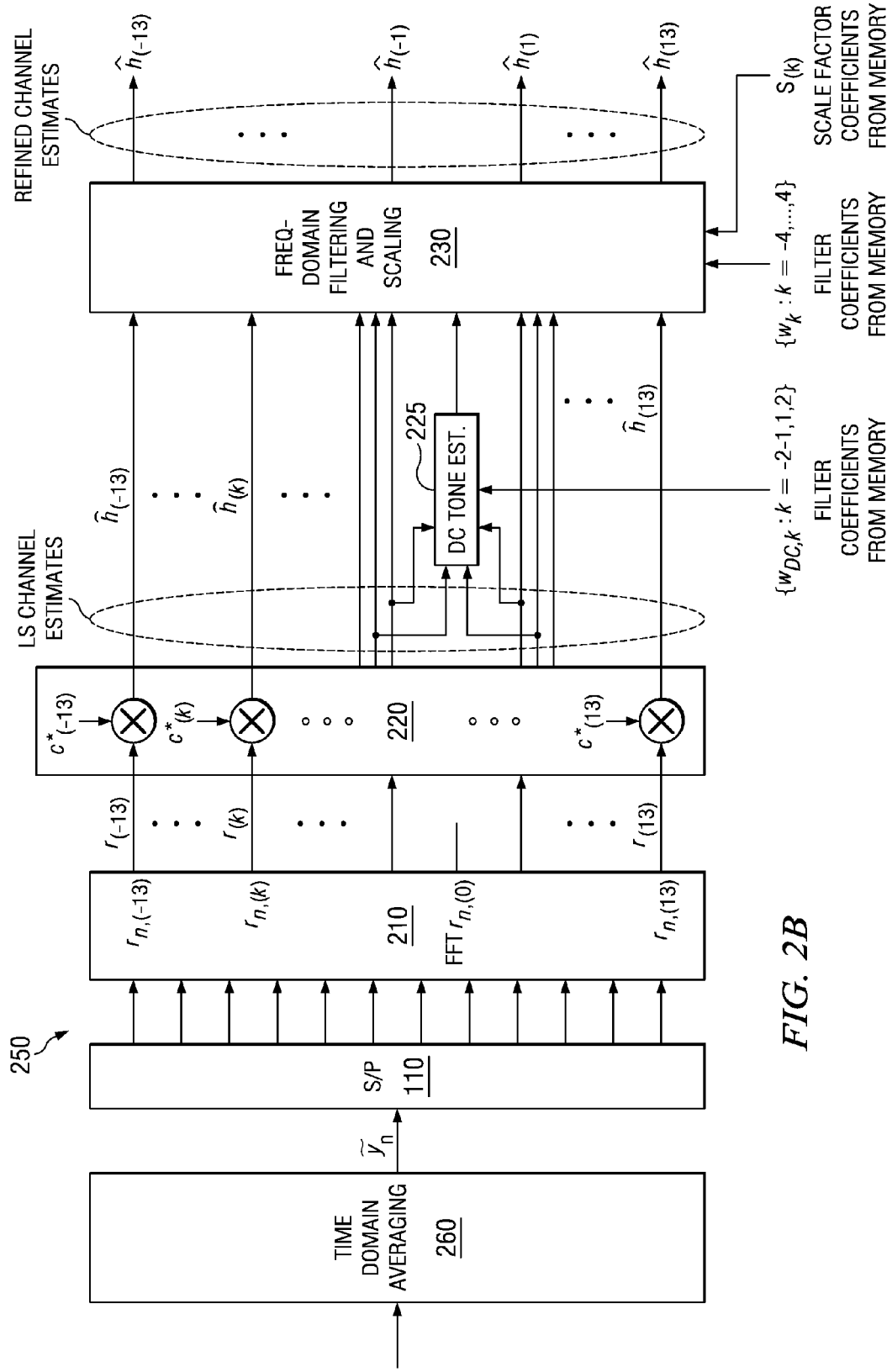
FIG. 2B is a top-level block diagram for an example channel estimator including time-domain averaging, FFT and LS signal processing to provide intermediate channel estimates, as well as a single frequency-domain filter applied to all sub-carriers including edge tones to generate refined channel estimates, according to an example embodiment. This FIG. depicts the particular case with $M_{DC}=4$ and $M_{CE}=9$.

FIG. 2B is a top-level block diagram for an example channel estimator 250 that utilizes time-domain averaging by including time-domain averaging block 260 as an alternative to frequency-domain averaging block 215 as shown in FIG. 2A. Time-domain averaging block 260 of channel estimator 250 applies time-domain averaging to the received signal before processing by S/P block 110, then by FFT block 210. In this embodiment for OFDM applications, time-domain averaging can be by a sample-by-sample average over the two symbol period of the LTF symbols in the preamble.

Figure 3:
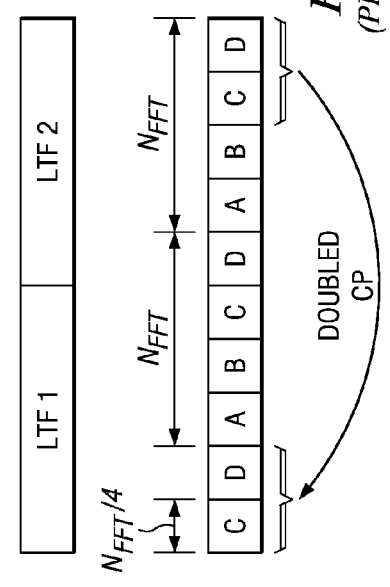
FIG. 3 shows a LTF structure for an OFDM preamble including the two LTF symbols that can be used for channel estimation at a receiver.

In OFDM systems, in order to facilitate channel estimation at the receiver, such as receiver 100, a predetermined signal (e.g., a Physical Layer Convergence Protocol (PLCP) preamble) is typically transmitted by a suitable transmitter at a known time. For example, in the OFDM physical layer (PHY) of IEEE 802.15.4 g, a PHY frame including a preamble having the LTF structure 300 including two LTF symbols shown in FIG. 3 as LTF 1 and LTF 2 can be used for channel estimation at the receiver. LTF structure 300 includes a doubled CP (i.e., 'CD' in the beginning of LTF 1 and at the end of LTF 2). The CP is added at the transmitter and removed at the receiver. This operation is used in communication systems using frequency-domain equalization (OFDM and SC-FDE) to make a linear convolution become a "circular" convolution. The CP length of C is shown as $N_{FFT}/4$, and ABCD as $N_{FFT}$, where $N_{FFT}$ is the FFT size.

The resulting time-domain samples output by time-domain averaging block 260 are represented as $\tilde{y}_n$. That is:

$$\tilde{y}_n = y_n + y_{n+N_{FFT}}, n=0,1,\ldots,N_{FFT}-1$$

where $y_n$ is the time-domain received OFDM signal. Following processing by S/P 110, FFT is then applied by FFT block 210 on the paralleled time-domain samples $\tilde{y}_n$.

A LS channel estimation block 220 follows the frequency-domain averaging block 215 in FIG. 2A and the FFT block 210 in FIG. 2B. LS channel estimation block 220 generates intermediate LS channel estimates for each of the plurality of sub-carriers. The channel estimation can be based on least-squares as follows.

$$\hat{h}_{bLS} = C^{-1}r = C^H r \quad (1)$$

where $C=\text{diag}(c_{(-N_a/2)}, \ldots, c_{(-1)}, c_{(1)}, \ldots, c_{(N_a/2)})$ and the common feature for the frequency-domain training sequence, $|c_{(k)}|^2 = c_{(k)}c_{(k)}^* = 1$, is exploited. This treatment is equivalent to the following processing for each sub-carrier k, $$\hat{h}_{(k)} = c_{(k)}^* r_{(k)} \quad (2)$$

Such LS channel estimation is relatively simple to implement and works robustly, especially in high signal to noise ratio (SNR) environments.

Frequency-domain filtering and scaling block 230 follows LS channel estimation block 220 and provides refined (improved) channel estimates as compared to the intermediate channel estimates provided by LS channel estimation block 220. Features of frequency-domain filtering and scaling block 230 include the same single frequency-domain filter being applied to process all sub-carriers (k) including edge tones. As described below, disclosed frequency-domain filtering implemented by frequency-domain filtering and scaling block 230 utilizes a single filter coefficient vector to combine two or more of the frequency domain samples on neighboring sub-carriers for generating the refined channel estimates for all of the sub-carriers (k) including edge tones, which significantly reduces the memory requirement to store the filter coefficients. In estimating edge tones, a scale factoring can be applied using frequency-domain filtering and scaling block 230 by providing as inputs scale factor coefficients $S_{(k)}$ for each sub-carrier k, which in one embodiment $S_{(k)}$ is different for each edge tone, and a constant for non-edge tones.

The refined channel estimation can use the intermediate LS channel estimates provided by LS channel estimation block 220 as inputs, and the following notation can be used:

$$\tilde{h} = \hat{h}_{bLS} = C^H r$$

Figure 1:
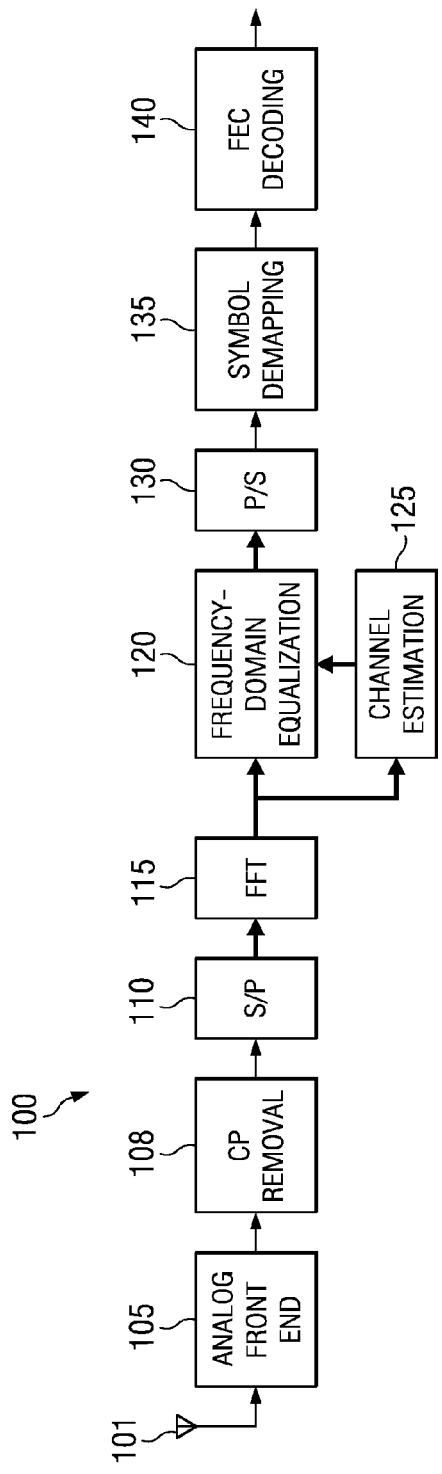
FIG. 1 is a block diagram depiction of a conventional wireless OFDM receiver which employs frequency-domain equalization for which disclosed channel estimator embodiments can be implemented.
Figure 4:
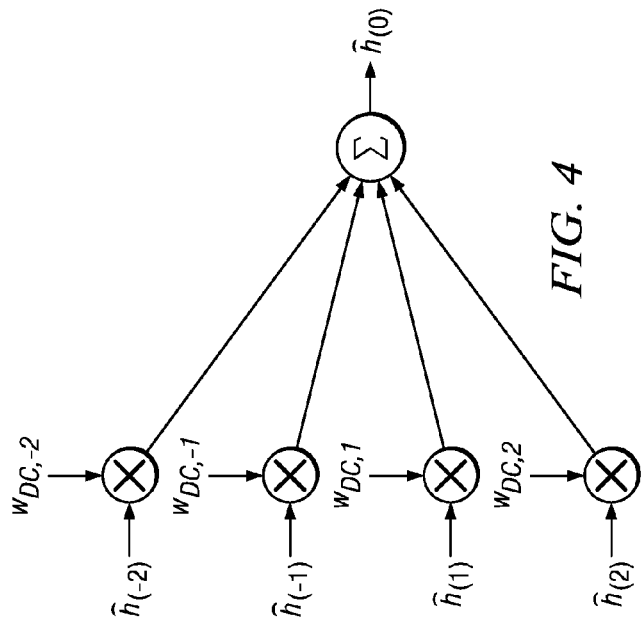
FIG. 4 shows an example DC tone estimation methodology that can be implemented by a disclosed DC tone estimation block, according to an example embodiment. This FIG. depicts the particular case with $M_{DC}=4$.

FIGS. 2A and 2B include a DC tone estimation block 225. DC tone estimation block 225 can estimate the DC tone by interpolating the DC tone using a predetermined number of nearest neighboring sub-carriers. FIG. 4 shows an example DC tone estimation methodology that can be implemented by DC tone estimation block 225, according to an example embodiment. Using $M_{DC}$ (e.g., 4) nearest sub-carriers around DC, the DC tone can be estimated as follows:

$$\hat{h}_{(0)} = \sum_{k \in \{-M_{DC}/2, -M_{DC}/2+1, \ldots, -1, 1, 2, \ldots, M_{DC}/2\}} w_{DC,k} \tilde{h}_{(k)} \quad (3)$$

where $w_{DC,k}$ represents the filter coefficients for DC tone estimation. FIG. 4 shows the general case where the filter coefficients $w_{DC,-2}$, $w_{DC,-1}$, $w_{DC,1}$, and $w_{DC,2}$ are all different. However, in some embodiments the filter coefficients include at least one "complex conjugate symmetric" ($w_{DC,-2}=w_{DC,2}^*$ and $w_{DC,-1}=w_{DC,1}^*$), or "symmetric" ($w_{DC,-2}=w_{DC,2}$ and $w_{DC,-1}=w_{DC,1}$) filter coefficient pair.

The $M_{DC}$-tap filter can be designed in an optimal manner (i.e., in a Minimum Mean Square Error (MMSE) sense), typically offline; and can be saved in memory (e.g., static RAM or ROM). In some embodiments, a plurality of different filter coefficient vectors are provided, and the frequency-domain filtering further comprises switching between the different filter coefficient vectors based on a value of at least one operation condition parameter. For example, several sets of filter coefficients $\{w_{DC,k}\}$ can be designed, each set providing a different filter coefficient vector for operation in a different operation condition, and can be saved in a suitable memory. A selection mechanism or criterion (e.g., based on the value of a signal-to-noise ratio (SNR) and/or channel length estimation, etc.) can be used to customize a particular frequency-domain filtering and scaling block 230 implemented by a computing device (e.g., DSP or ASIC) from a set of frequency-domain filter coefficients each providing a filter coefficient vector stored in a suitable memory.

Figure 5:
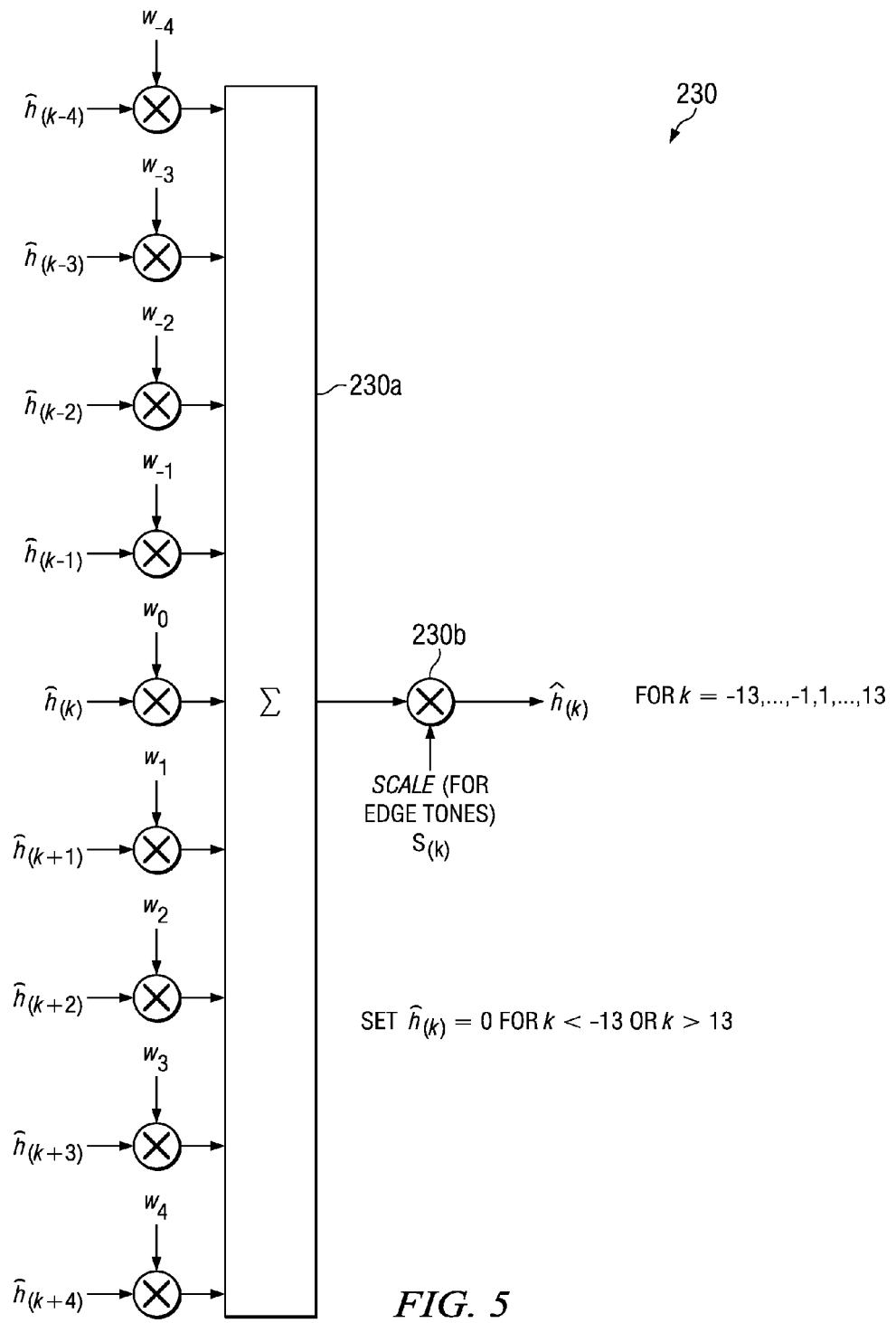
FIG. 5 shows an example realization for a frequency-domain filtering and scaling block for providing generating refined channel estimates, according to an example embodiment. This FIG. depicts for the particular case with $N_a=26$ and $M_{CE}=9$.

FIG. 5 shows an example realization for a frequency-domain filtering and scaling block 230 for providing refined channel estimates from intermediate channel estimates, according to an example embodiment. FIG. 5 shows the general case where the filter coefficients $w_1$, $w_2$, $w_3$, $w_4$, $w_0$, $w_{-1}$, $w_{-2}$, $w_{-3}$, $w_{-4}$ for the filter coefficient vector are all different. However, as described above relative to FIG. 4, in some embodiments the filter coefficients ($w_k$'s) include at least one "complex conjugate symmetric" ($w_{-k}=w_k^*$) or "symmetric" ($w_{-k}=w_k$) pair.

The frequency-domain filtering can be performed using the nearest $M_{CE}$ neighboring sub-carriers to a selected frequency location for estimating the channel response for each sub-carrier. In order to enable a single frequency-domain filter for processing all sub-carriers, a simple scaling operation using a scale factor for sub-carrier edge tones ($S_{(k)}$) is added at 230b shown in FIG. 5 to the output of frequency-domain filter 230a for estimating the edge tones. $S_{(k)}$ is used as the notation to emphasize the scaling factor may be different for certain sub-carriers, such as the edge tones. As noted above, as used herein, "edge tones" refer to the sub-carriers (k) that do not have the full $M_{CE}$ sub-carriers ($M_{CE}$ typically is odd number), since they are located near the edge of the data sub-carriers, shown in FIG. 5 as sub-carriers k=−13 through −10, and 10 through 13 when $M_{CE}=9$ and $N_a=26$. Mathematically, frequency-domain filtering and scaling operation for refined channel estimation provided by a disclosed frequency-domain filtering and scaling block 230 can be expressed as follows:

$$\hat{h}_{(k)} = S_{(k)} \sum_{m=-\lfloor M_{CE}/2 \rfloor}^{\lfloor M_{CE}/2 \rfloor} w_m \tilde{h}_{(k+m)} \quad (4)$$

where $\tilde{h}_{(k)}$ is the intermediate LS channel estimate for the sub-carrier k, $\tilde{h}_{(k)}=0$ for $k<-N_a/2$ or $k>N_a/2$, $\{w_m\}$ represents the filter coefficient vector having the frequency-domain filter coefficients, and $S_{(k)}$ is the scale factor for each sub-carrier k. $S_{(k)}$ can be set to 1 or a another constant for all non-edge tones (e.g., −9≤k≤9 when $M_{CE}=9$ and $N_a=26$), and $S_{(k)}$ can increase as the tone location moves to an edge of active tones (edge tones).

The $M_{CE}$-tap frequency-domain filter that is used to signal process all sub-carriers, such as shown in FIG. 5, can be designed in optimal way (i.e., in a Minimum Mean Square Error (MMSE) sense), typically offline; and saved in a suitable memory. Using a MMSE design criterion, a common (single) frequency-domain filter 230a can be designed having frequency-domain filter coefficients (also known as weighting factors) denoted by a single filter coefficient vector w, as follows:

$$w = \Sigma_{h_{(k)} h_{[k]}} (\Sigma_{h_{[k]} h_{[k]}} + \Sigma_{n_{[k]} n_{[k]}})^{-1} \quad (5)$$

where:
$h_{[k]}=[h_{(n)}: |n-k| \leq \lfloor M_{CE}/2 \rfloor$ and $|n| \leq N_a/2]^T$: are the vector of frequency-domain channel response for the $M_{CE}$ sub-carriers that are nearest to a selected frequency location (k) for $h_{(k)}$,
$n_{[k]}$: the frequency-domain noise vector corresponding to $h_{[k]}$ in LS channel estimates,
$\Sigma_{h_{(k)} h_{[k]}} = E\{h_{(k)} h_{[k]}^H\}$: the covariance vector between $h_{(k)}$ and $h_{[k]}$,
$\Sigma_{h_{[k]} h_{[k]}} = E\{h_{[k]} h_{[k]}^H\}$: the auto-covariance vector of $h_{[k]}$,
$\Sigma_{n_{[k]} n_{[k]}} = E\{n_{[k]} n_{[k]}^H\}$: the auto-covariance vector of $n_{[k]}$. If noise variances for $n_{[k]}$ are uniform, $\Sigma_{n_{[k]} n_{[k]}} = \sigma_n^2 I$.

In designing frequency-domain filter 230a to implement (5), the selected frequency location k can be one of non-edge tones.

Alternatively, averaging over non-edge tones can be further added as follows:

$$w = \frac{1}{|T_{non-edge}|} \sum_{k \in T_{non-edge}} \left[ \Sigma_{h_{(k)} h_{[k]}} \left( \Sigma_{h_{[k]} h_{[k]}} + \Sigma_{n_{[k]} n_{[k]}} \right)^{-1} \right] \quad (6)$$

where $T_{non-edge}$ is the set of logical frequencies for non-edge tones.

As described above, several sets of filter coefficients (each providing a different filter coefficient vector for implementing a particular frequency-domain filter) can be designed, each for a different operation condition, and saved in a suitable memory. A selection mechanism or criterion (based on e.g., SNR and/or channel length estimation, etc.) can be used to select a particular frequency-domain filtering and scaling block 230 implemented by a computing device from a set of frequency-domain filters stored in a memory.

For each edge tone, different scale factors can be provided by providing an optimal scaling factor ($S_k$) which be calculated (typically offline) as follows:

$$S_{(k)} = \arg\min_s \| w^{opt} - s\tilde{w} \|^2 \quad (7)$$

$$= \frac{\sum_m \tilde{w}_m^* w_m^{opt}}{\sum_m |\tilde{w}_m|^2}$$

where:

$w^{opt}$ represents the optimal filter (with each filter element represented by $w_m^{opt}$) that is obtained for each particular tone (sub-carrier) location using an optimal design method (e.g., in an MMSE sense):

$$w^{opt} = \Sigma_{h_{(k)} h_{[k]}} (\Sigma_{h_{[k]} h_{[k]}} + \Sigma_{n_{[k]} n_{[k]}})^{-1} \quad (8)$$

It is noted that the $w^{opt}$ is generally different from w for the edge tones; $\tilde{w}$ (with each element represented by $\tilde{w}_m$) is the truncated version (for the particular tone location) of the common (single) frequency-domain filter defined by w. For example, when $M_{CE}=9$ and $N_a=26$, for the edge tone location k=11, $$\tilde{w} = [w_{-4}, w_{-3}, w_{-2}, w_{-1}, w_0, w_1, w_2].$$

If a real-valued scaling factor is desired, the scaling factors ($S_k$) can be represented as:

$$S_{(k)} = \arg\min_s \| \tilde{w}^{opt} - s\tilde{w} \|^2 \quad (9)$$

$$= \frac{\sum_m \tilde{w}_m \tilde{w}_m^{opt}}{\sum_m |\tilde{w}_m|^2}$$

where $\tilde{w}^{opt} = \begin{bmatrix} \text{Re}\{w^{opt}\} \\ \text{Im}\{w^{opt}\} \end{bmatrix}$, $\tilde{w} = \begin{bmatrix} \text{Re}\{w\} \\ \text{Im}\{w\} \end{bmatrix}$, and the elements of $\tilde{w}^{opt}$ and $\tilde{w}$ are denoted by $\tilde{w}_m^{opt}$ and $\tilde{w}_m$, respectively.

Figure 6:
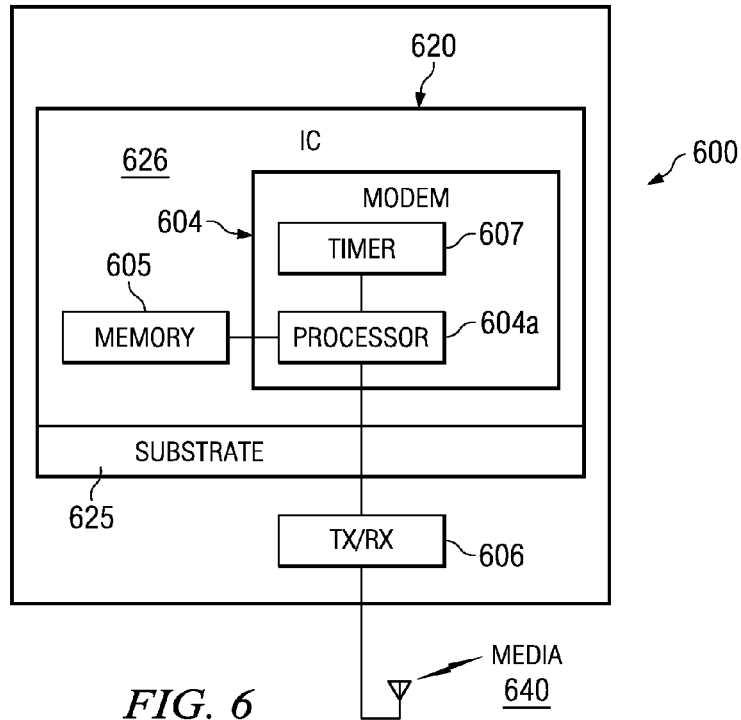
FIG. 6 is a block diagram schematic of a communication device having a disclosed modem that implements channel estimation when operating as a receiver using a disclosed channel estimation algorithm, according to an example embodiment.

FIG. 6 is a block diagram schematic of a communication device 600 having a disclosed modem 604 that implements a disclosed channel estimation algorithm when operating as a receiver, according to an example embodiment. In one particular embodiment, communications device 600 can be used in a smart utility networks (SUN) based on IEEE 802.15.4 g, at a service node (which includes switch nodes and terminal nodes) or a base (data concentrator) node in the network. In another embodiment, communications device 600 is used in a wired network, such as a powerline communication (PLC) network.

Modem 604 includes a processor (e.g., a digital signal processor, (DSP)) 604a coupled to an associated memory 605 that that stores a disclosed channel estimation algorithm which provides code for the algorithm, and can store coefficients and frequency-domain filter arrangements, including at least one common frequency-domain filter consisting of a single filter coefficient vector having a plurality of frequency-domain filter coefficients to generate refined channel estimates for each sub-carriers. As described above, disclosed embodiments include utilizing several sets of filter coefficients, with each set providing a different filter coefficient vector for operation in a different operation condition, such as SNR.

Memory 605 comprises non-transitory machine readable storage, for example, static random-access memory (SRAM). In operation, the processor 604a is programmed to implement a disclosed channel estimation algorithm. Modem 604 includes a timer 607, such as for ACK transmission, Carrier Sense Multiple Access/collision avoidance (CSMA)/CA) back-off and data transmission purposes in SUNs or PLC networks.

The transceiver (TX/RX) 606 is communicably coupled to the modem 604 for coupling of the communications device 600 to the transmission media 640. The modem 604 is shown formed on an integrated circuit (IC) 620 comprising a substrate 625 having a semiconductor surface 626, such as a silicon surface. Memory 605 may be included on the IC 620. In another embodiment the modem 604 is implemented using 2 processor chips, such as 2 DSP chips. Besides the DSP noted above, the processor 604a can comprise a desktop computer, laptop computer, cellular phone, smart phone, or an application specific integrated circuit (ASIC).

Figure 7:
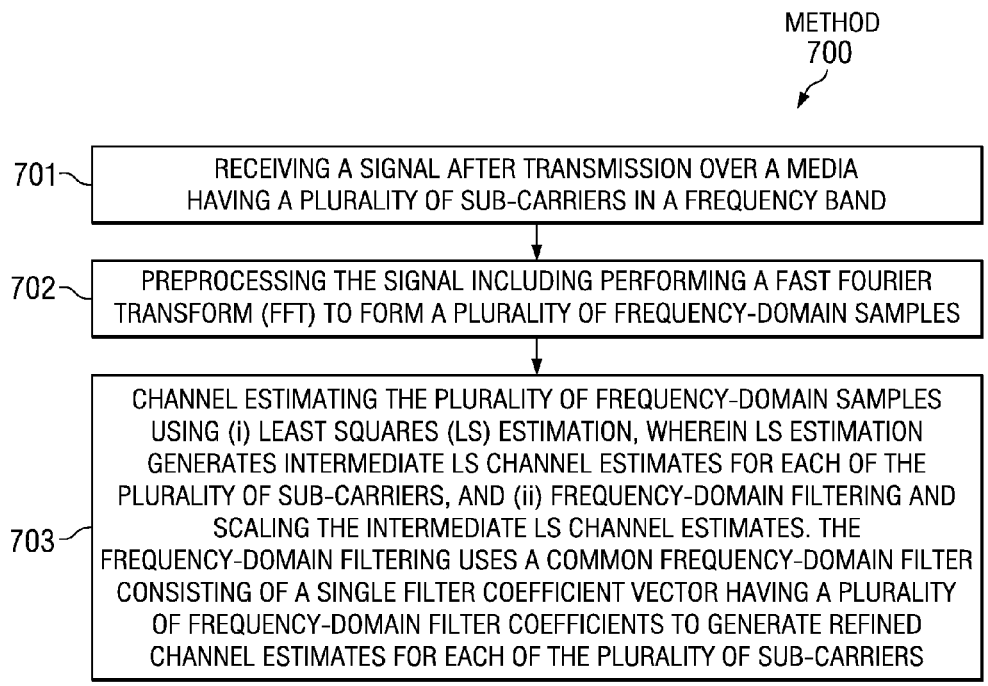
FIG. 7 is a flowchart for an example method of channel estimation, according to an example embodiment.

FIG. 7 is a flowchart for an example method 700 of channel estimation. Step 701 comprises receiving a signal after transmission over a media having a plurality of sub-carriers in a frequency band. Step 702 comprises preprocessing the signal including performing a fast Fourier transform (FFT) to form a plurality of frequency-domain samples. Step 703 comprises channel estimating the plurality of frequency-domain samples using (i) least squares (LS) estimation, wherein LS estimation generates intermediate LS channel estimates for each of the plurality of sub-carriers, and (ii) frequency-domain filtering and scaling the intermediate LS channel estimates. The frequency-domain filtering uses a common frequency-domain filter consisting of a single filter coefficient vector having a plurality of frequency-domain filter coefficients to generate refined channel estimates for each of the plurality of sub-carriers. The plurality of frequency-domain filter coefficients/filter coefficient vector is operable to combine two or more of the frequency-domain samples on neighboring ones of the plurality of sub-carriers to generate the refined channel estimates. The preprocessing can further comprises frequency-domain averaging after FFT or time-domain averaging before FFT. The refined channel estimates are useful for implementing channel equalization in the equalizer of a receiver, particularly for low cost or limited memory applications.

Disclosed embodiments are applicable to communication systems based on frequency-domain equalization, including both wireless and wire-based systems. OFDM is used in digital subscriber line (DSL) standards, and wireless LAN standards such as the American IEEE. 802.11™ (WiFi) and its European equivalent HIPRLAN/2. OFDM has also been proposed for wireless broadband access standards such as IEEE 802.16 (WiMAX) and as the core technique for the fourth-generation (4G) wireless mobile communications. In PLC, OFDM is used in standards such as the IEEE 802.15.4 g SUN [Physical layer specifications for low data rate wireless smart metering utility networks, P802.15.4 g/D4, April, 2011].

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

I claim:

1. A method of channel estimation, comprising:
   receiving a signal after transmission over a media, said signal having a plurality of sub-carriers in a frequency band;
   preprocessing said signal including performing a fast Fourier transform (FFT) to generate a plurality of frequency-domain samples, and;
   channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates,
   wherein said frequency-domain filtering uses a frequency-domain filter consisting of a single filter coefficient vector having a plurality of frequency-domain filter coefficients to generate refined channel estimates for each of said plurality of sub-carriers, wherein said frequency-domain filtering and scaling is implemented by the following relation:

$$\hat{h}_{(k)} = S_{(k)} \sum_{m=-\lfloor M_{CE}/2 \rfloor}^{\lfloor M_{CE}/2 \rfloor} w_m \tilde{h}_{(k+m)} \quad (4)$$

wherein $\hat{h}_{(k)}$ represents ones of said refined channel estimates for said plurality of sub-carriers, wherein k represents ones of said plurality of sub-carriers, and $M_{CE}$ represents a predetermined number of neighboring ones of said plurality of sub-carriers for estimating each of said plurality of sub-carriers, wherein $\hat{h}_{(k)}=0$ for $k<-N_a/2$ or $k>N_a/2$, wherein $N_a$ represents a total number of said plurality of sub-carriers, $\{w_m\}$ represents said single filter coefficient vector having said plurality of frequency-domain filter coefficients, $\tilde{h}_{(k)}$ represents intermediate least-squares based channel estimate for the sub-carrier k, and $S_{(k)}$ is a scale factor for said scaling.

2. The method of claim 1, wherein said preprocessing further comprises frequency-domain averaging after said FFT or time-domain averaging before said FFT.

3. The method of claim 1, wherein said plurality of sub-carriers includes a DC sub-carrier and before said channel estimating interpolating said DC sub-carrier using a predetermined number of nearest neighboring ones of said plurality of sub-carriers.

4. The method of claim 1, wherein said frequency-domain filter is designed based on a minimum mean square error (MMSE) design criterion represented as w was follows:

$$w = \Sigma_{h_{(k)}h_{[k]}} (\Sigma_{h_{[k]}h_{[k]}} + \Sigma_{n_{[k]}n_{[k]}})^{-1}$$

where:
   $\hat{h}_{[k]} = [h_{(n)}: |n-k| \leq \lfloor M_{CE}/2 \rfloor$ and $|n| \leq N_a/2]^T$ represents a vector of frequency-domain channel response $h_{(k)}$ for said $M_{CE}$ of said plurality of sub-carriers k that are nearest to a selected frequency location for said $h_{(k)}$,
   $n_{[k]}$ represents a frequency-domain noise vector corresponding to $h_{[k]}$ in said intermediate LS channel estimates,
   $\Sigma_{h_{(k)}h_{[k]}} = E\{h_{(k)}h_{[k]}^H\}$ represents a covariance vector between $h_{(k)}$ and $h_{[k]}$,
   $\Sigma_{h_{[k]}h_{[k]}} = E\{h_{[k]}h_{[k]}^H\}$ represents an auto-covariance vector of $h_{[k]}$,
   $\Sigma_{n_{[k]}n_{[k]}} = E\{n_{[k]}n_{[k]}^H\}$ represents an auto-covariance vector of $n_{[k]}$, wherein if noise variances for $n_{[k]}$ are uniform, $\Sigma_{n_{[k]}n_{[k]}} = \sigma_n^2 I$,
   $\sigma_n^2$ represents a noise variance and I is an Identity matrix.

5. The method of claim 4, wherein said selected frequency location is a non-edge tone of said plurality of sub-carriers.

6. A method of channel estimation, comprising:
   receiving a signal after transmission over a media, said signal having a plurality of sub-carriers in a frequency band;
   preprocessing said signal including performing a fast Fourier transform (FFT) to generate a plurality of frequency-domain samples, and;
   channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates,
   wherein said frequency-domain filtering uses a frequency-domain filter consisting of a single filter coefficient vector having a plurality of frequency-domain filter coefficients to generate refined channel estimates for each of said plurality of sub-carriers, wherein said frequency-domain filtering further comprises averaging over non-edge tones of said plurality of sub-carriers as follows:

$$w = \frac{1}{|T_{non-edge}|} \sum_{k \in T_{non-edge}} \left[ \Sigma_{h_{(k)}h_{[k]}} \left( \Sigma_{h_{[k]}h_{[k]}} + \Sigma_{n_{[k]}n_{[k]}} \right)^{-1} \right]$$

wherein $T_{non-edge}$ is a set of logical frequencies for said non-edge tones, w is a frequency-domain filter, $h_{[k]}$ represents a vector of frequency-domain channel response $h_{(k)}$, $n_{[k]}$ represents a frequency-domain noise vector corresponding to $h_{[k]}$ in said intermediate LS channel estimates,
   $\Sigma_{h_{(k)}h_{[k]}} = E\{h_{(k)}h_{[k]}^H\}$ represents a covariance vector between $h_{(k)}$ and $h_{[k]}$,
   $\Sigma_{h_{[k]}h_{[k]}} = E\{h_{[k]}h_{[k]}^H\}$ represents an auto-covariance vector of $h_{[k]}$,
   $\Sigma_{n_{[k]}n_{[k]}} = E\{n_{[k]}n_{[k]}^H\}$ represents an auto-covariance vector of $n_{[k]}$, wherein if noise variances for $n_{[k]}$ are uniform, $\Sigma_{n_{[k]}n_{[k]}} = \sigma_n^2 I$, and
   $\sigma_n^2$ represents a noise variance and I is an Identity matrix.

7. A method of channel estimation, comprising:
receiving a signal after transmission over a media, said signal having a plurality of sub-carriers in a frequency band;
preprocessing said signal including performing a fast Fourier transform (FFT) to generate a plurality of frequency-domain samples, and;
channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates,
wherein said frequency-domain filtering uses a frequency-domain filter consisting of a single filter coefficient vector having a plurality of frequency-domain filter coefficients to generate refined channel estimates for each of said plurality of sub-carriers, wherein said scaling comprises calculating a scaling factor ($S_k$) for each edge tone of said plurality of sub-carriers k as follows:

$$S_{(k)} = \arg\min_s \|w^{opt} - s\tilde{w}\|^2$$
$$= \frac{\sum_m \tilde{w}_m^* w_m^{opt}}{\sum_m |\tilde{w}_m|^2}$$

where:
$\tilde{w}$ is a truncated version of a frequency-domain filter with each element represented by $\tilde{w}_m$, $w^{opt}$ represents an optimal filter (with each filter element represented by $w_m^{opt}$) that is obtained for each particular location of said plurality of sub-carriers using an optimal design method in an MMSE sense:

$$w^{opt} = \Sigma_{h_{(k)}h_{[k]}}(\Sigma_{h_{[k]}h_{[k]}} + \Sigma_{n_{[k]}n_{[k]}})^{-1}$$

where $h_{[k]}$ represents a vector of frequency-domain channel response $h_{(k)}$, $n_{[k]}$ represents a frequency-domain noise vector corresponding to $h_{[k]}$ in said intermediate LS channel estimates,
$\Sigma_{h_{(k)}h_{[k]}} = E\{h_{(k)}h_{[k]}^H\}$ represents a covariance vector between $h_{(k)}$ and $h_{[k]}$,
$\Sigma_{h_{[k]}h_{[k]}} = E\{h_{[k]}h_{[k]}^H\}$ represents an auto-covariance vector of $h_{[k]}$,
$\Sigma_{n_{[k]}n_{[k]}} = E\{n_{[k]}n_{[k]}^H\}$ represents an auto-covariance vector of $n_{[k]}$, wherein if noise variances for $n_{[k]}$ are uniform, $\Sigma_{n_{[k]}n_{[k]}} = \sigma_n^2 I$, and
$\sigma_n^2$ represents a noise variance and I is an Identity matrix.

8. A method of channel estimation, comprising:
receiving a signal after transmission over a media, said signal having a plurality of sub-carriers in a frequency band;
preprocessing said signal including performing a fast Fourier transform (FFT) to generate a plurality of frequency-domain samples, and;
channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates,
wherein said frequency-domain filtering uses a frequency-domain filter consisting of a single filter coefficient vector having a plurality of frequency-domain filter coefficients to generate refined channel estimates for each of said plurality of sub-carriers k, wherein said scaling comprises generating real-valued scaling factors represented as:

$$S_{(k)} = \arg\min_s \|\tilde{w}^{opt} - s\tilde{w}\|^2$$
$$= \frac{\sum_m \tilde{w}_m \tilde{w}_m^{opt}}{\sum_m |\tilde{w}_m|^2}$$

where $\tilde{w}^{opt} = \begin{bmatrix} \text{Re}\{w^{opt}\} \\ \text{Im}\{w^{opt}\} \end{bmatrix}$, $\tilde{w} = \begin{bmatrix} \text{Re}\{w\} \\ \text{Im}\{w\} \end{bmatrix}$, elements of $\tilde{w}^{opt}$ and $\tilde{w}$ are denoted by $\tilde{w}_m^{opt}$ and $\tilde{w}_m$, respectively, $w^{opt}$ represents an optimal filter, and w is a frequency-domain filter.

9. The method of claim 6, wherein said signal is an OFDM signal including a preamble having a first long training field (LTF) symbol and a second LTF symbol which each include a first CP to provide a doubled CP, and wherein said preprocessing further comprises removing one of said first CPs before performing said FFT.

10. The method of claim 6, wherein said plurality of frequency-domain filter coefficients include at least one complex conjugate symmetric or symmetric filter coefficient pair.

11. The method of claim 6, further comprising providing a plurality of different ones of said single filter coefficient vector, and wherein said frequency-domain filtering further comprises switching between said plurality of different ones of said single filter coefficient vector based on a value of at least one operation condition parameter.

12. A receiver, comprising:
an analog front end (AFE) coupled to an antenna for receiving a signal having a plurality of sub-carriers in a plurality of frequency channels;
a memory which stores a channel estimation algorithm including code for channel estimating,
a modem coupled to said memory and said AFE, said modem including a processor programmed to implement channel equalization using refined channel estimates for each of said plurality of sub-carriers generated by said channel estimation algorithm applied to said signal, said processor programmed to implement:
preprocessing said signal including performing a fast Fourier transform (FFT) to form a plurality of frequency-domain samples;
channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates, wherein said frequency-domain filtering uses a frequency-domain filter consisting of a single filter coefficient vector having a plurality of frequency-domain filter coefficients to generate said refined channel estimates for each of said plurality of sub-carriers, wherein said frequency-domain filtering and scaling is implemented by the following relation:

$$\hat{h}_{(k)} = S_{(k)} \sum_{m=-\lfloor M_{CE}/2 \rfloor}^{\lfloor M_{CE}/2 \rfloor} w_m \tilde{h}_{(k+m)}$$

wherein $\hat{h}_{(k)}$ represents ones of said refined channel estimates for said plurality of subcarriers, wherein k represents ones of said plurality of sub-carriers, and $M_{CE}$ represents a predetermined number of neighboring ones of said plurality sub-carriers for estimating each of said plurality of sub-carriers, wherein $\hat{h}_{(k)}=0$ for $k<-N_a/2$ or $k>N_a/2$, $N_a$ represents a total number of said plurality of sub-carriers, $\{w_m\}$ represents said single filter coefficient vector having said frequency-domain filter coefficients, $S_{(k)}$ is a scale factor for said scaling, $\hat{h}_{(k)}$ and represents intermediate least-squares based channel estimate for the sub-carrier k.

13. The receiver of claim 12, wherein said preprocessing further comprises frequency-domain averaging after said FFT or time-domain averaging before said FFT.

14. The receiver of claim 12, wherein said plurality of sub-carriers includes a DC sub-carrier and before said channel estimating interpolating said DC sub-carrier using a predetermined number of nearest neighboring ones of said plurality of sub-carriers.

15. The receiver of claim 12, wherein said modem is formed on an integrated circuit (IC) comprising a substrate having a semiconductor surface, wherein said processor comprises a digital signal processor (DSP).

16. A receiver, comprising:
an analog front end (AFE) coupled to an antenna for receiving a signal having a plurality of sub-carriers in a plurality of frequency channels;
a memory which stores a channel estimation algorithm including code for channel estimating,
a modem coupled to said memory and said AFE, said modem including a processor programmed to implement channel equalization using refined channel estimates for each of said plurality of sub-carriers generated by said channel estimation algorithm applied to said signal, said processor programmed to implement:
  preprocessing said signal including performing a fast Fourier transform (FFT) to form a plurality of frequency-domain samples;
  channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates, wherein said frequency-domain filtering uses a frequency-domain filter consisting of a single filter coefficient vector having a plurality of frequency-domain filter coefficients to generate said refined channel estimates for each of said plurality of sub-carriers, wherein said frequency-domain filter is designed based on a minimum mean square error (MMSE) design criterion represented as was follows:

$$w = \Sigma_{h_{(k)}h_{[k]}}(\Sigma_{h_{[k]}h_{[k]}} + \Sigma_{n_{[k]}n_{[k]}})^{-1}$$

where:
$h_{[k]}=[h_{(k)}; |n-k| \leq \lfloor M_{CE}/2 \rfloor$ and $|n| \leq N_a/2]^T$ represents a vector of frequency-domain channel response $N_{(k)}$ for $M_{CE}$, a plurality of sub-carriers that are nearest to a selected frequency location for $h_{(k)}$, $N_a$ represents a total number of said plurality of sub-carriers,
$n_{[k]}$ represents a frequency-domain noise vector corresponding to $h_{[k]}$ in said intermediate LS channel estimates,
$\Sigma_{h_{(k)}h_{[k]}}=E\{h_{(k)}h_{[k]}^H\}$ represents a covariance vector between $h_{(k)}$ and $h_{[k]}$,
$\Sigma_{h_{[k]}h_{[k]}}=E\{h_{[k]}h_{[k]}^H\}$ represents an auto-covariance vector of $h_{[k]}$, $\Sigma_{n_{[k]}n_{[k]}}=E\{n_{[k]}n_{[k]}^H\}$ represents an auto-covariance vector of $n_{[k]}$, wherein if noise variances for $n_{[k]}$ are uniform, $\Sigma_{n_{[k]}n_{[k]}}=\sigma_n^2 I$,
$\sigma_n^2$ represents a noise variance and I is an Identity matrix.

17. A receiver, comprising:
an analog front end (AFE) coupled to an antenna for receiving a signal having a plurality of sub-carriers in a plurality of frequency channels;
a memory which stores a channel estimation algorithm including code for channel estimating,
a modem coupled to said memory and said AFE, said modem including a processor programmed to implement channel equalization using refined channel estimates for each of said plurality of sub-carriers generated by said channel estimation algorithm applied to said signal, said processor programmed to implement:
  preprocessing said signal including performing a fast Fourier transform (FFT) to form a plurality of frequency-domain samples;
  channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates, wherein said frequency-domain filtering uses a frequency-domain filter consisting of a single filter coefficient vector having a plurality of frequency-domain filter coefficients to generate said refined channel estimates for each of said plurality of sub-carriers, wherein said frequency-domain filtering further comprises averaging over non-edge tones of said plurality of sub-carriers as follows:

$$w = \frac{1}{|T_{non-edge}|} \sum_{k \in T_{non-edge}} \left[ \Sigma_{h_{(k)}h_{[k]}}(\Sigma_{h_{[k]}h_{[k]}} + \Sigma_{n_{[k]}n_{[k]}})^{-1} \right] \quad (2)$$

wherein $T_{non-edge}$ is a set of logical frequencies for said non-edge tones, w is a frequency-domain filter, $h_{[k]}$ represents a vector of frequency-domain channel response $h_{(k)}$, $n_{[k]}$ represents a frequency-domain noise vector corresponding to $h_{[k]}$ in said intermediate LS channel estimates,
$\Sigma_{h_{(k)}h_{[k]}}=E\{h_{(k)}h_{[k]}^H\}$ represents a covariance vector between $h_{(k)}$ and $h_{[k]}$,
$\Sigma_{h_{[k]}h_{[k]}}=E\{h_{[k]}h_{[k]}^H\}$ represents an auto-covariance vector of $h_{[k]}$,
$\Sigma_{n_{[k]}n_{[k]}}=E\{n_{[k]}n_{[k]}^H\}$ represents an auto-covariance vector of $n_{[k]}$, wherein if noise variances for $n_{[k]}$ are uniform, $\Sigma_{n_{[k]}n_{[k]}}=\sigma_n^2 I$, and
$\sigma_n^2$ represents a noise variance and I is an Identity matrix.

18. A receiver, comprising:
an analog front end (AFE) coupled to an antenna for receiving a signal having a plurality of sub-carriers in a plurality of frequency channels;
a memory which stores a channel estimation algorithm including code for channel estimating,
a modem coupled to said memory and said AFE, said modem including a processor programmed to implement channel equalization using refined channel estimates for each of said plurality of sub-carriers generated by said channel estimation algorithm applied to said signal, said processor programmed to implement:

preprocessing said signal including performing a fast Fourier transform (FFT) to form a plurality of frequency-domain samples;

channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates, wherein said frequency-domain filtering uses a frequency-domain filter consisting of a single filter coefficient vector having a plurality of frequency-domain filter coefficients to generate said refined channel estimates for each of said plurality of sub-carriers, wherein said scaling comprising calculating a scaling factor ($S_k$) for each edge tone of said plurality of sub-carriers k as follows:

$$S_{(k)} = \arg\min_s \|w^{opt} - s\tilde{w}\|^2$$
$$= \frac{\sum_m \tilde{w}_m^* w_m^{opt}}{\sum_m |\tilde{w}_m|^2}$$

where:
$\tilde{w}$ is a truncated version of a frequency-domain filter with each element represented by $\tilde{w}_m$, $w^{opt}$ represents an optimal filter (with each filter element represented by $w_m^{opt}$) that is obtained for each particular location of said plurality of sub-carriers using an optimal design method in an MMSE sense:

$$w^{opt} = \Sigma_{h_{(k)}h_{[k]}} (\Sigma_{h_{[k]}h_{[k]}} + \Sigma_{n_{[k]}n_{[k]}})^{-1}$$

where $h_{[k]}$ represents a vector of frequency-domain channel response $h_{(k)}$, $n_{[k]}$ represents a frequency-domain noise vector corresponding to $h_{[k]}$ in said intermediate LS channel estimates, $\Sigma_{h_{(k)}h_{[k]}} = E\{h_{(k)}h_{[k]}^H\}$ represents a covariance vector between $h_{(k)}$ and $h_{[k]}$, $\Sigma_{h_{[k]}h_{[k]}} = E\{h_{[k]}h_{[k]}^H\}$ represents an auto-covariance vector of $h_{[k]}$, $\Sigma_{n_{[k]}n_{[k]}} = E\{n_{[k]}n_{[k]}^H\}$ represents an auto-covariance vector of $n_{[k]}$, wherein if noise variances for $n_{[k]}$ are uniform, $\Sigma_{n_{[k]}n_{[k]}} = \sigma_n^2 I$, and $\sigma_n^2$ represents a noise variance and I is an Identity matrix.

19. A receiver, comprising:

an analog front end (AFE) coupled to an antenna for receiving a signal having a plurality of sub-carriers in a plurality of frequency channels;

a memory which stores a channel estimation algorithm including code for channel estimating, a modem coupled to said memory and said AFE, said modem including a processor programmed to implement channel equalization using refined channel estimates for each of said plurality of sub-carriers generated by said channel estimation algorithm applied to said signal, said processor programmed to implement:

preprocessing said signal including performing a fast Fourier transform (FFT) to form a plurality of frequency-domain samples;

channel estimating said plurality of frequency-domain samples using (i) least squares (LS) estimation to generate intermediate LS channel estimates for each of said plurality of sub-carriers, and (ii) frequency-domain filtering and scaling said intermediate LS channel estimates, wherein said frequency-domain filtering uses a frequency-domain filter consisting of a single filter coefficient vector having a plurality of frequency-domain filter coefficients to generate said refined channel estimates for each of said plurality of sub-carriers, wherein said scaling comprises generating real-valued scaling factors represented as:

$$S_{(k)} = \arg\min_s \|\tilde{w}^{opt} - s\tilde{w}\|^2$$
$$= \frac{\sum_m \tilde{w}_m \tilde{w}_m^{opt}}{\sum_m |\tilde{w}_m|^2}$$

where $\tilde{w}^{opt} = \begin{bmatrix} \text{Re}\{w^{opt}\} \\ \text{Im}\{w^{opt}\} \end{bmatrix}$, $\tilde{w} = \begin{bmatrix} \text{Re}\{w\} \\ \text{Im}\{w\} \end{bmatrix}$, elements of $\tilde{w}^{opt}$ and $\tilde{w}$ are denoted by $\tilde{w}_m^{opt}$ and $\tilde{w}_m$, respectively, $w^{opt}$ represents an optimal filter, and w is a frequency-domain filter.

20. The receiver of claim 12, wherein said signal is an OFDM signal including a preamble having a first long training field (LTF) symbol and a second LTF symbol which each include a first CP to provide a doubled CP, and wherein said preprocessing further comprises removing one of said first CPs before performing said FFT.

21. The receiver of claim 12, wherein said plurality of frequency-domain filter coefficients include at least one complex conjugate symmetric or symmetric filter coefficient pair.

22. The receiver of claim 12, wherein said memory stores a plurality of different ones of said single filter coefficient vector, and wherein said frequency-domain filtering further comprises switching between said plurality of different ones of said single filter coefficient vector based on a value of at least one operation condition parameter.

23. The method of claim 6, wherein said preprocessing further comprises frequency-domain averaging after said FFT or time-domain averaging before said FFT.

24. The method of claim 6, wherein said plurality of sub-carriers includes a DC sub-carrier and before said channel estimating interpolating said DC sub-carrier using a first predetermined number of nearest neighboring ones of said plurality of sub-carriers.

25. The method of claim 8, wherein said signal is an OFDM signal including a preamble having a first long training field (LTF) symbol and a second LTF symbol which each include a first CP to provide a doubled CP, and wherein said preprocessing further comprises removing one of said first CPs before performing said FFT.

26. The method of claim 8, wherein said plurality of frequency-domain filter coefficients include at least one complex conjugate symmetric or symmetric filter coefficient pair.

* * * * *